Nov. 10, 1931.  G. T. HUXFORD ET AL  1,831,353
APPARATUS FOR GRINDING
Filed April 14, 1928   6 Sheets-Sheet 1
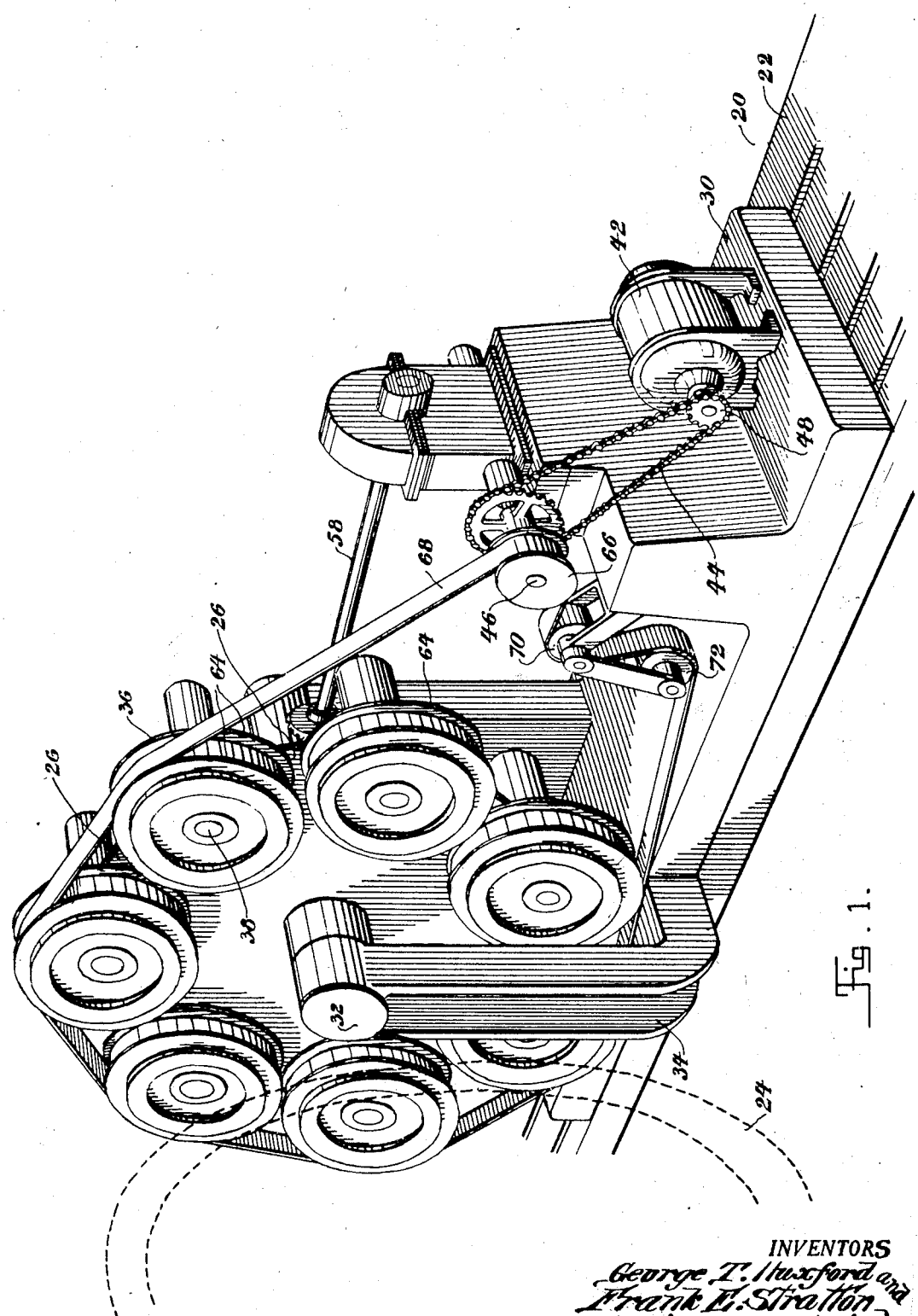
INVENTORS
George T. Huxford and
Frank E. Stratton
By Thomas A. Jenckes Jr.
ATTORNEY.

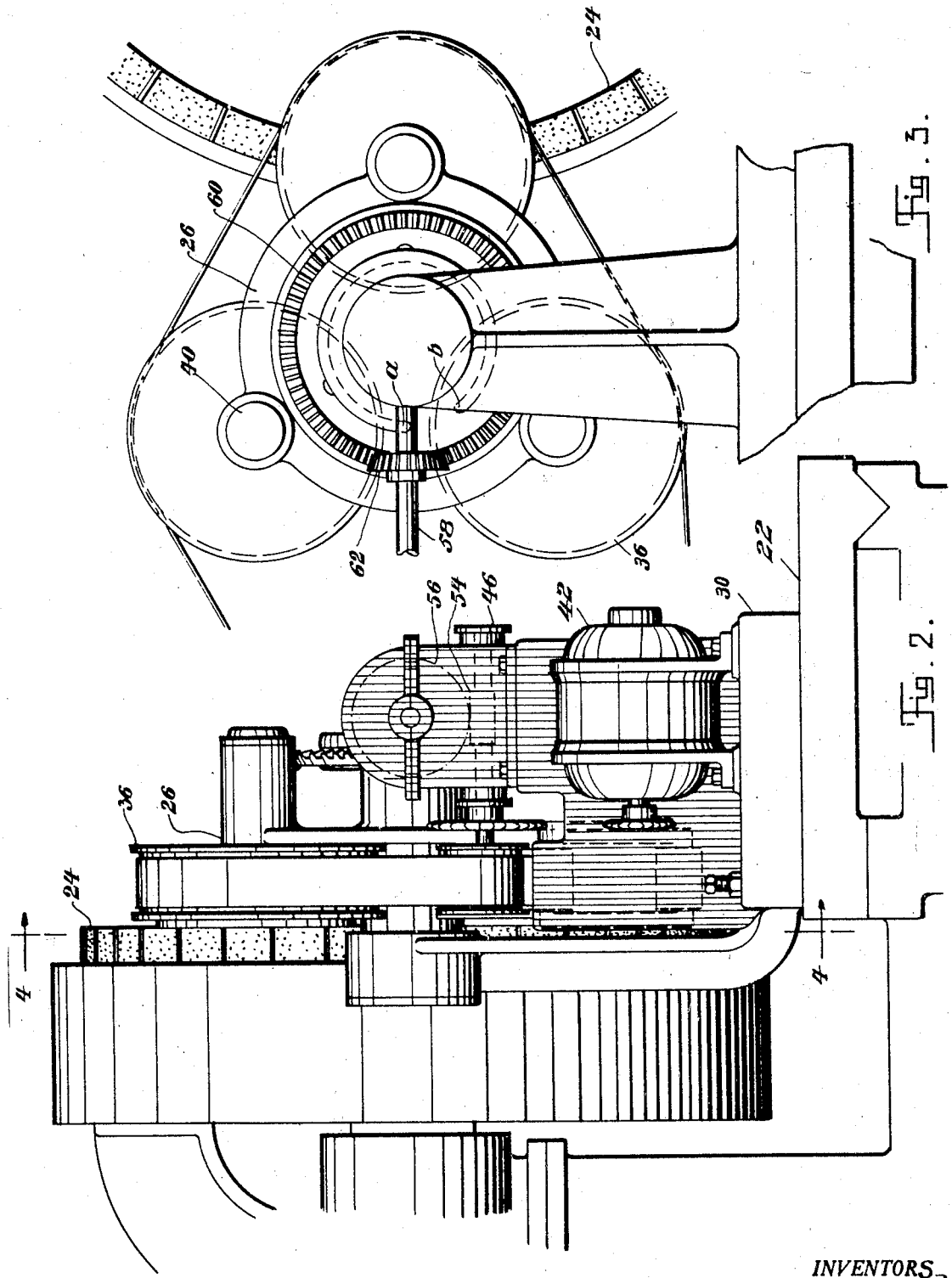

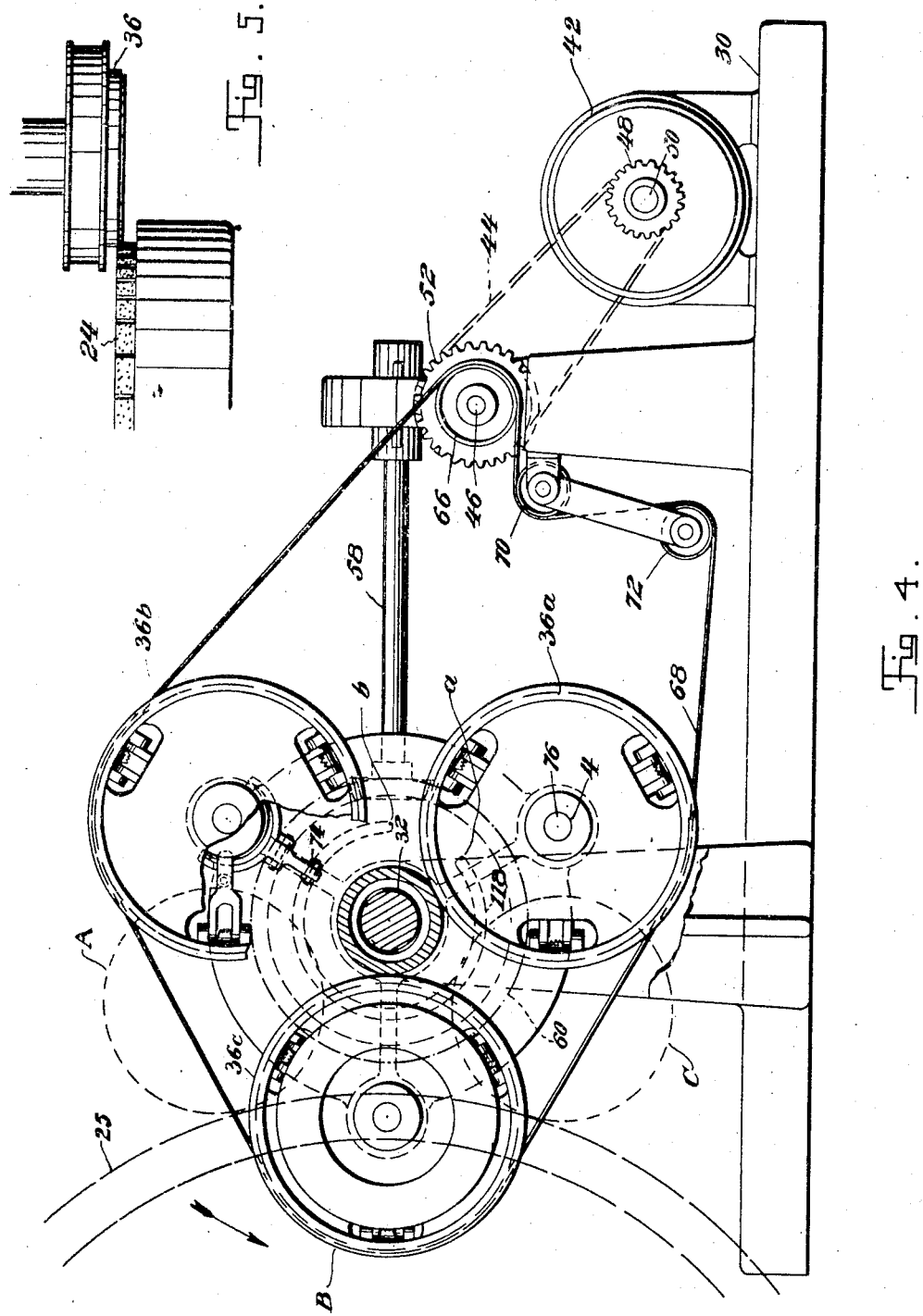

Nov. 10, 1931.    G. T. HUXFORD ET AL    1,831,353
APPARATUS FOR GRINDING
Filed April 14, 1928    6 Sheets-Sheet 4
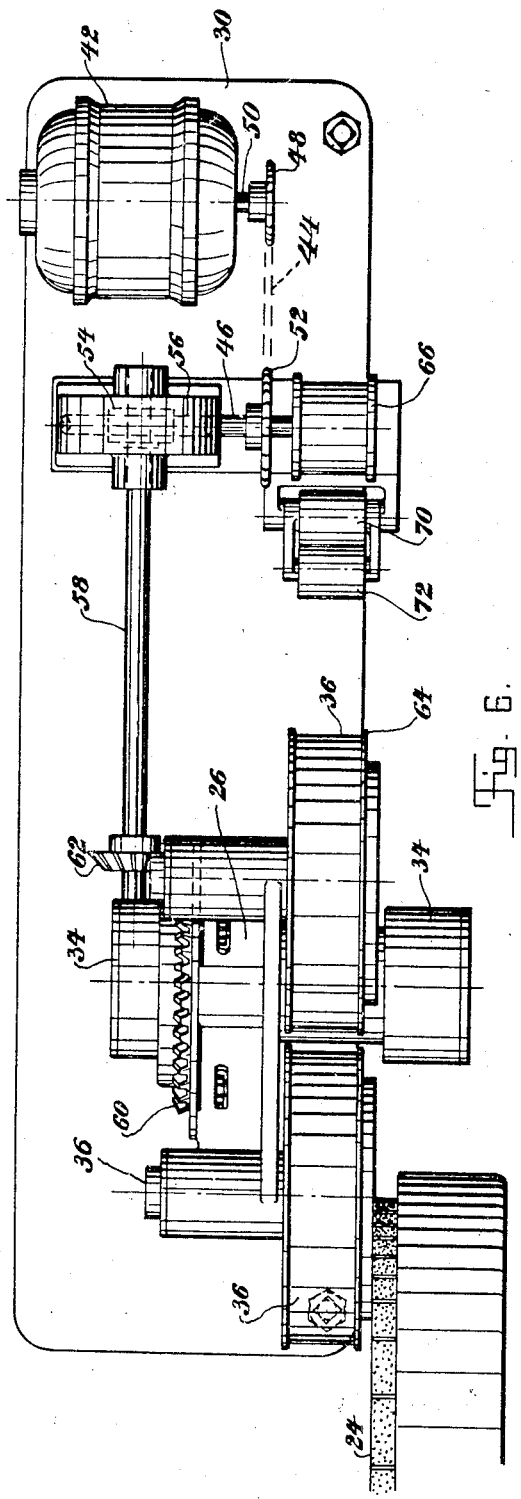
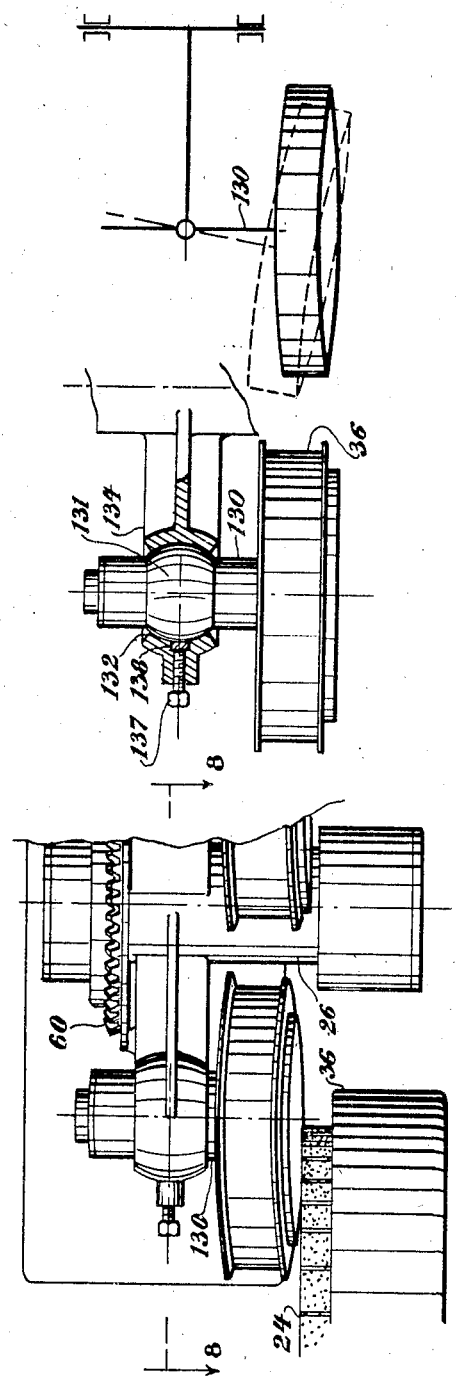
INVENTORS
George T. Huxford and
Frank E. Stratton
By Thomas A. Jenckes Jr.
ATTORNEYS.

Nov. 10, 1931.　　G. T. HUXFORD ET AL　　1,831,353
APPARATUS FOR GRINDING
Filed April 14, 1928　　6 Sheets-Sheet 5

INVENTORS
George T. Huxford and
Frank E. Stratton
By Thomas A. Jenckes Jr.
ATTORNEY.

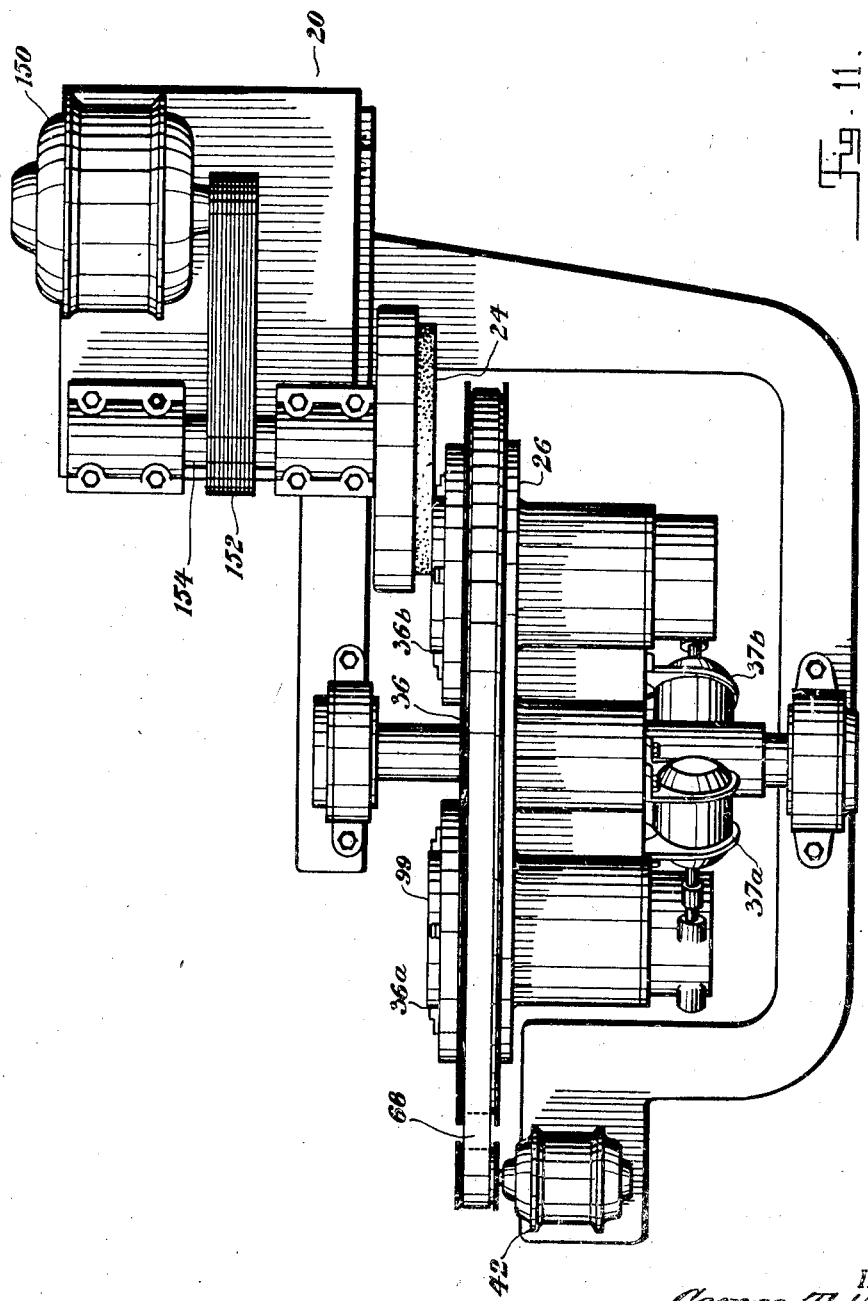

Patented Nov. 10, 1931

1,831,353

UNITED STATES PATENT OFFICE

GEORGE T. HUXFORD, OF PROVIDENCE, AND FRANK E. STRATTON, OF CRANSTON, RHODE ISLAND, ASSIGNORS TO DIAMOND MACHINE COMPANY, OF PROVIDENCE, RHODE ISLAND, A CORPORATION OF RHODE ISLAND

APPARATUS FOR GRINDING

Application filed April 14, 1928. Serial No. 270,095.

Our invention relates to improvements in the method of an apparatus for grinding capable of carrying out said improved method.

An object of our invention is to provide a grinding method and apparatus especially designed to eliminate the mechanical spring in the apparatus so far as is possible.

Another object of our invention is to provide an apparatus and method which will grind more evenly than former types, partially due to the fact that whatever pressure is initially employed and whatever spring is present in the apparatus is evenly distributed over the rotating surface desired to be ground.

A further object of our invention is to shorten the time necessary for grinding. As the work is relatively rotated in addition to the wheel it is apparent that in a definite time there is a greater and more uniform distribution of cutting action of each active abrasive grain over the surface of the work to be ground than if the work were stationary, and the area of the work in contact with the grinding surface is maintained at a maximum, and so far as possible ever particle in the work is swept by every abrasive grain in the wheel. We preferably employ a substantially flat grinding surface such as the rim of an annulus or the side of a disk and so far as we are aware we are the first to rotate the work preferably on an axis within itself preferably on its own center while being held in grinding relationship against a rotating substantially flat grinding surface. While the substantially flat grinding surface is preferably held coincident with the surface of the work to be ground, it is obvious that said surface may be relatively slightly tilted if desired for any reason or if desired to grind a flat conical surface.

While our method may be employed in any type of grinding it is preferably adapted to be used in grinding in a plane at an angle to the horizontal, preferably in a vertical plane on a horizontal spindle type of grinding machine. It is thus obvious that as the work is held at an angle to the horizontal the detritus will tend by the force of gravity to drop off and not interfere with the grinding operation.

While our invention broadly comprises rotating a piece of work, preferably on an axis within itself while being held in contact with a rotating grinding element, preferably a substantially flat grinding surface, our invention particularly also comprises an improved method of continuous so called automatic grinding. We preferably mount a plurality of work holding chucks on a rotatable chuck holding center, mount a piece of work on a chuck, rotate the chuck center until said work comes into grinding position opposite a rotatable grinding element, revolve the element and also preferably simultaneously the work, preferably on its own center for the desired grinding period and while that piece of work is being subjected to the grinding period load another chuck with a piece of work in a position out of contact with said element. We then rotate the chuck holding center to bring the ground work out of grinding position and the freshly loaded work into grinding position, grind the work in grinding position and revolve the chuck holding center. Thus the loading position for the operative is always the same and directly in front of the chuck desired to be loaded.

The "piece" of work may be integral or a plurality of pieces mounted symmetrically about the axis of any of the work holding chucks. The surface to be ground may be plane, conical or cylindrical, or variations therefrom. It must, however, be a surface of revolution.

Whereas, as stated, our invention includes rotating a piece of work preferably on an axis within itself against a rotating grinding element, which may be accomplished with the rotating work held stationary during its contact with the wheel, if however, the improved loading method described in the last paragraph is employed, the work may either be moved to a position opposite a stationary grinding wheel and the grinding element and work revolved for the desired grinding period, thereby performing an intermittent operation of alternately grinding and rotating the chuck holding center or preferably the rotating piece of work may be continuously moved while in contact with the grinding element across the grinding face thereof, preferably in a curved line and preferably rotated across. While the features of our invention as hitherto described may be employed in any type of grinding element our invention is particularly adapted for use with a so called cup or cylinder type of wheel, wherein the grinding surface thereof comprises a circular preferably substantially flat rim. For reasons to be explained, when a cup wheel is employed, it is particularly desirable that the work be moved during its contact with the wheel. Similar results are achieved with a cup wheel whether the work is reciprocated or moved in a straight line across a portion of the wheel or moved in a broken line, or preferably rotated across, and analogous although not quite so good results may be attained with a disk wheel having a substantially flat grinding surface.

Where a cup or disk wheel is employed and the work is rotated while being ground, it is apparent that there will be an appreciable amount of mechanical spring when the revolving work first contacts the revolving rim of the wheel and while it is moving across the periphery thereof. Due to the pressure employed the initial pass of the rotating work across the periphery of the wheel is largely an abrading heavy cutting action in which a considerable amount of the work is taken off. The effect of the spring is thus substantially compensated for during the initial stage and as the work is rotating is more evenly distributed thereover. After the rotating work passes the periphery of the rotating wheel, it is obvious that it may then contact the rotating wheel at two points unless discs, cones, etc. are being ground. This acts as a smoothing flattening or finishing grinding and if the rotating work contacts the wheel at a plurality of points it will tend to flatten out the work against the wheel resulting in a very smooth and uniform surface of contact all the way around and a very smooth and even grinding. In moving out of range of the grinding wheel, it is apparent that for the third stage the work will again pass across the periphery of the wheel. This results in a highly desirable graining operation normally a circumferential graining. Thus, by our improved method, we are enabled to get a result hitherto only possible on three different types of machines, namely, (a) A first stage heavy grinding action on a rough grinder or a cutter.

(b) A smoothing and straightening or flattening operation and, (c) A graining operation only hitherto possible on a graining machine.

We preferably form a stream, preferably a rotating stream of work made up of a plurality of pieces of revolving work and we preferably so space the work in the stream that one piece of work will be crossing the rim for the initial heavy grinding state, another piece of work will contact the work at two points of its periphery for a smoothing or flattening grinding state and a third piece of work will be contacting the periphery of the rim, withdrawing from grinding contact with the wheel for the third stage or the graining operation substantially simultaneously. The aforementioned results will be distinctly attained in the operation resolving into three well defined stages, if the plane of the surface to be ground is substantially parallel and coincides with the plane of the grinding surface of the wheel. However, if the plane of the work is tilted at an angle away from the plane of the grinding surface of the grinding annulus in the direction of its motion the first and second stages, while still well defined, will become slightly merged and the effect of the spring and pressure, instead of being all felt to make the first stage a heavy grinding stage will be more evenly distributed between the first and second stages.

Further objects of our invention relate to an apparatus for carrying out our improved method in which the pieces of work are preferably mounted on a rotating work holding center, which crosses the grinding surface of the rotating grinding wheel, thus subjecting the work to the well defined stages of grinding and finishing it with a desirable circumferential grain. We preferably provide means in said apparatus to if desired, relatively tilt the work and wheel so that their planes will not be substantially coincident. This may be done by tilting the wheel relative to the work or by tilting the chuck holder or the chucks individually relative to the wheel. While the salient features of our invention may be built into a grinding machine, we preferably, as shown, in the drawings provide our apparatus as an attachment for existing types of grinding machines adapted to be mounted on the bed thereof in which the work holding center and its chucks are all mounted on a suitable separate frame adapted to be mounted on said bed in the desired contacting relationship with the grinding wheel.

These and such other objects of our invention as may hereinafter appear will be best understood from a description of the accompanying drawings, which illustrate various embodiments thereof.

In the drawings, Fig. 1 is a perspective view of the preferred embodiment of our invention mounted on the bed of a horizontal spindle grinding machine in which pieces of work are subjected to the three grinding stages simultaneously.

Fig. 2 is an end elevation of a grinding machine having our improved attachment mounted on the bed thereof.

Fig. 3 is a front elevation of a portion of our improved attachment with adjacent portions of the grinding wheel.

Fig. 4 is a sectional view taken along the line 4—4 of Fig. 2, the relative position of the wheel being indicated in dotted lines.

Fig. 5 is a diagrammatic view showing how the work is preferably adjusted to abut the wheel to cause the spring and pressure to make it first pass across the periphery of the rim in an abrading or heavy grinding action.

Fig. 6 is a plan view of our improved attachment and adjacent portions of the grinding wheel.

Fig. 7 is a fragmentary plan view of a portion of the apparatus shown in Fig. 6 in which the plane of each individual chuck may be slightly tilted at any angle from the plane of the wheel to distribute the effects of the spring and pressure between the different grinding stages.

Fig. 8 is a detailed plan view taken of the improved chuck attachment preferably employed, partially shown in section on line 8—9 of Fig. 7.

Fig. 8a is a diagrammatic view illustrating the universal adjustment of the chucks on the center.

Fig. 11 is a plan view of a different embodiment of our invention in which the work holding center is not continuously rotated, but is only rotated between grinding periods to bring the work into grinding position from a loading position and vice versa.

Figure 9:
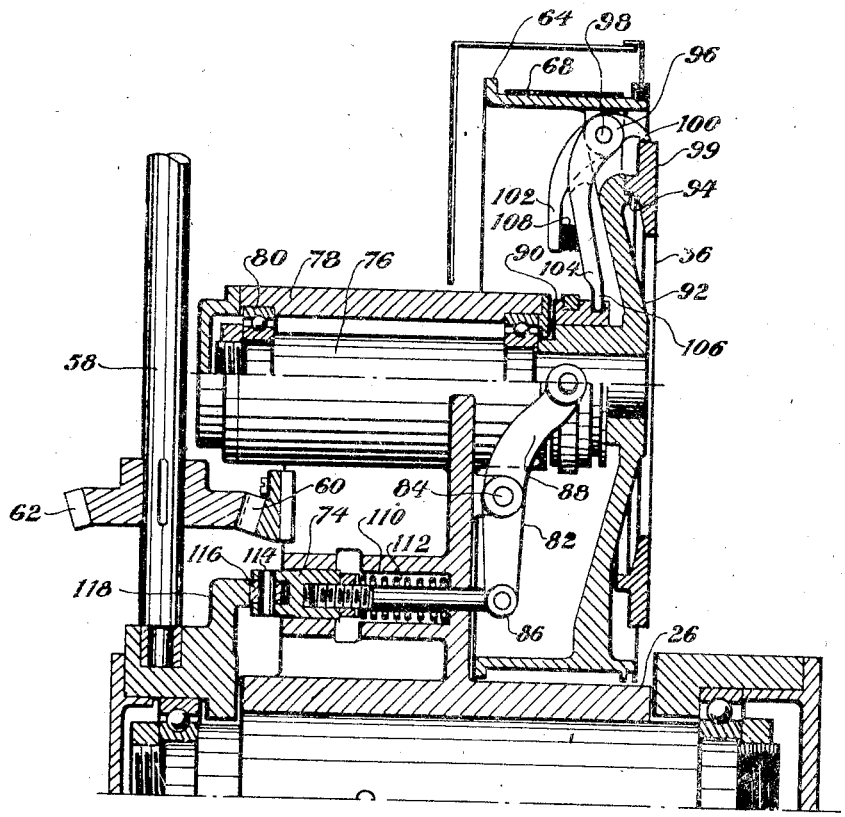
Fig. 9 is a detailed sectional view of the preferred form of work holding chuck we preferably employ showing the means we preferably employ to release it from clamping position and the adjacent portion of the chuck holding center on which it is mounted.
Figure 10:
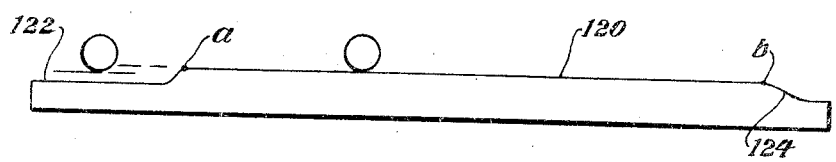
Fig. 10 is a diagrammatic view showing the development of the cam-way.

In the drawings, wherein like characters of reference indicate like parts throughout, 20 generally indicates a grinding machine provided with the usual table 22 and the usual grinding element 24. As shown in the drawings our invention in its preferred form comprises an attachment for use on already existing types of horizontal spindle grinding machines. While certain features of our invention, such as the revolving of the work during the desired grinding period may take place in any plane on any type of a grinding machine, we preferably, as stated employ a grinding machine in which the grinding element thereof comprises a cup wheel or a disk wheel in order to secure the three desired stages in the grinding operation. Fig. 11 shows an embodiment of our invention in which the chuck holding center 26 is first rotated to bring the work desired to be ground into grinding position and the ground work into unloading position and the work and wheel then revolved, while the work is held stationary in grinding position, we preferably however, continuously move the work across the flat grinding surface of the rotating element preferably as shown in Figs. 1–10 in a circle so as to secure in the final stage the desired circumferential grain and to permit a more easy loading and unloading thereof. Figs. 2–10 illustrate an embodiment of our invention in which the work holding center only has three chucks mounted thereon. Fig. 1, however, shows the preferred embodiment of our invention in which the chuck holding center 26 has a large plurality of chucks 36 mounted thereon so as to permit at least one piece of work to be subjected to one stage of the grinding operation, while other pieces of work are simultaneously being subjected to the other stages of the grinding operation.

Fig. 11 moreover shows our invention constructed as an integral part of the grinding machine, which may be done if desired.

As shown in Figs. 1–10 we provide the frame 30 for our improved attachment on which is mounted on a spindle 32 mounted on trunnions 34 upstanding from said frame 30, the chuck holding center 26. We mount a plurality of chucks 36 preferably by means of spindles 76 mounted in suitable holes 40 therefor near the periphery of the chuck holding center 26. We provide means to rotate the work holding center. In our preferred embodiment, said means comprises the motor 42, which drives through the medium of the drive chain 44, the shaft, 46. The drive chain 44 meshes with the sprocket 48 on the motor drive shaft 50 and the driving sprocket 52 mounted on the shaft, 46. The shaft 46 has the worm 54 mounted thereon, which meshes with the worm gear 56 on the shaft 58. The chuck holding center 26 is provided on the rear face thereof with the circumferential bevel drive gear 60 which is driven by the bevel gear 62 on the adjacent end of the drive shaft 58. Said motor 42 thus through the means thus described rotates the chuck holding center 26. The chucks 36 are preferably cylindrical and are provided with means, whereby each may be individually and intermittently revolved, for example on the periphery of each with the belt recess 64. In this case a pulley 66 is also mounted on the drive shaft 46. The belt 68 passes around the pulley 66 and within the pulley guideways 64 on the periphery of each chuck 36 and thus rotates at least each chuck which is opposite the grinding wheel. The belt 68 is provided with any suitable type of slack preventing device such as the pulleys 70 and 72 suitably pivoted so as to automatically adjust the slack.

While any suitable type of work holding chucks 36 may be employed, we preferably employ the releasable chucks 36 shown in detail in Fig. 9 each provided with a suitable releasing finger 74 projecting forwardly therefrom. The chucks 36 are suitably mounted at the end of spindles 76 mounted on suitable bearings 78 projecting radially outwardly from the chuck center 26, said spindles 76 being preferably mounted on ball bearings 80 on said bearings 78. A lever of the first class 82 for each chuck is also pivoted as at 84 on said bearings 78. The power arm 86 of said lever has attached to it a sleeve 90 slidable on said spindle 76. Each chuck 36 is provided with the work receiving face 92, preferably having a lip 94 or other means projecting therefrom to abut the inner periphery of the work. To clamp the outer periphery of the work against said lip 94, we provide the spring actuated gripping fingers 96 comprising levers of the first class mounted on said chuck as at 98 having the work arms 100 thereof adapted to contact the outer periphery of the work and retain it in position against the lip 94 and the power arms 102 thereof projecting in rear of another link 104 also pivoted at 98 to the chucks 36 and having the outer end 106 thereof embedded in a recess in the slidable sleeve 90. A spring 108 is inserted between the outer side of the power arm 102 of the lever 98 and the inner surface of the link 104. The releasing fingers 74 comprise the pistons 74 mounted in the cylinders 110 projecting forwardly from each chuck and urged forwardly by the springs 112. The end 114 of the piston projects forwardly from the cylinder 110 and preferably has the roller 116 mounted thereon. The rollers 116 are normally adapted to abut a circular cam 118 shown in more detail in Fig. 10 stationarily mounted on the frame 30. As shown more in detail in Figs. 4 and 10 the circular cam 118 is so constructed as to have a portion 120 of its periphery relatively high between the points a and b to hold the work clamped in the chucks and a portion 122 of its periphery relatively low to permit the spring 112 to push the piston 74 inwards to move the lever 82 to slide the sleeve 90 outwards to push the links 104 forward to raise up the work arms 100 of the levers 96 to free the work 99 from gripping engagement between the fingers 100 and the lip 94 thus permitting it to be released and a new piece of work to be laid in the recess between the lip 94 and fingers 100. Referring once more to Fig. 10 we see that the rise is gradual between the relatively low portion 122 and the relatively high portion 120 and as said releasing finger 74 abuts this rise 124 it will push the piston 74 inwards against the pressure of the spring 112 to move the respective sleeve 90 inwards of said shaft 76 to move the links 104 inwards and through the pressure of the springs 108, the power arms 102 of the levers 96 inwards causing the gripping fingers 100 to compress the work between them and the lip 94 and while the end of the plunger 74 abuts the relatively high portion 120 of the cam 118 the work will be securely held in clamping position. Thus, when a plurality of chucks are employed the cam is preferably constructed as shown with a relatively small low releasing portion 122 so that the operative may stand adjacent said portion and take away and put in pieces of work at the same time from the chucks 36 in released position. During the rest of the cycle the work will be securely clamped to the chuck, even though the clamping portion of the cycle is considerably greater than the portion of the cycle during which the work is in contact with the wheel.

We also provide means as shown in Figs. 7 and 8 whereby each individual chuck may be tilted to hold the work surface to be ground tilted at an angle from the plane of the grinding surface in the direction of the direction of the works motion. As shown in Figs. 7, 8 and 8ª we universally mount the chuck shafts 130 in the universal bearings 132 at the ends of the trunnions 134 projecting from the chuck holder 26 and we employ the lock screw 137 which actuates the clamp plug 138 to clamp the shafts 130 in tilted position. A portion 131 of the bearing is enlarged to form the ball 131 to fit into the universal socket 132 in the trunnion 134. It is thus obvious that on unloosening the lock screw 132 the chuck shaft may be tilted at any angle relative to the work and locked in desired grinding position. In Fig. 8ª we have illustrated in dotted lines the relative position of the chuck shaft for grinding a conical surface. Though we have shown the relative adjustment between the grinding surface and the work provided for by means of relatively adjusting the position of the individual chucks, it is obvious that if desired, the entire chuck holder 26 may be tilted relative to the grinding surface or that the grinding surface may be tilted relative to the stationary chucks or chuck holder.

As stated, Fig. 11 illustrates a type of semi-continuous, semi-automatic grinding machine having certain features of our invention incorporated therein, namely, that of the continuous rotating work holding center 26 with two chucks 36 mounted on diametrically opposite points on the periphery thereof and intermittently rotatable for a semi-revolution to bring intermittently either alternate chuck 36ª or 36ᵇ into alternate grinding position opposite the grinding wheel 24. In this embodiment we provide the motor 150 which drives through the medium of the belt 152 the grinding wheel 24 mounted on the cross shaft 154 and we individually revolve through the medium of the motors 37ª and 37ᵇ, the chucks 36ª and 36ᵇ. The chuck holding center is revolved as shown in the embodiment by the belt 68 driven by the motor 42. As stated, the operation of this apparatus is semi-automatic and while the respective controls of the motors may be synchronized so as to make their turning off and on automatic, they may if desired as shown in the drawings be manually controlled in operation. Assuming that there is no work in any chuck, the chuck 36ᵇ is first loaded with work by the operative standing opposite it, the chuck 36ª occupying the grinding position shown in the drawings. The motor 42 is then turned on and this automatically shuts itself off after a half revolution of the chuck holding center 26 to bring the loaded chuck 36ᵇ into respective grinding position opposite and adjacent to the wheel 24. The motor 37ᵇ is then manually turned on to revolve the chuck 36ᵇ with its contained work and the motor 150 is turned on to revolve the grinding wheel 24. The work 99 is thus held in a stationary position while revolved. The work 99 in the chuck 36ᵇ is then revolved and the wheel 24 revolved for the desired grinding period after which the motor 37ᵇ is and 150 may be turned off to stop rotation of the work 99 in the chuck 36ᵇ and rotation of the wheel and the motor 42 turned on to revolve the chuck holding center to cause the work 99 in the chuck 36ᵇ shown to revolve to a loading position and the freshly loaded work in the chuck 36ª to revolve to grinding position. When the work 99 in the chuck 36ª has attained a grinding position, the wheel 24 and chuck 36ª are then rotated through the medium of the motors 150 and 37ª for the desired grinding period, the chuck 36ᵇ being unloaded of its ground work and charged with a new piece of work. This cycle of operations is continuously repeated, the motors 150 and 37ª and 37ᵇ being turned on for the desired period of time and then turned off, and the motor 42 being turned on for the desired rotating period of the chuck holding center 26.

While the type of apparatus just described in the preceding paragraph embodies certain features of our invention, it does not move the work across the flat grinding surface of the grinding element during the grinding period, which is desirable for various reasons, namely, if a cup or disk wheel is employed to perform the three stage operation hitherto explained and to provide speed in the grinding operation by forming a stream of work consisting of rotating pieces of work following one after the other, preferably so spaced that at one single time there will be at least a single piece of work simultaneously in each cutting stage. We will now describe the operation of the apparatus shown in Figs. 2–10 for carrying out the preferred embodiment of our improved method. Assuming that no individual chuck is loaded with work, the operative takes his position opposite the point b on the cam and while the chuck 36ª (Fig. 4) is in released position inserts a piece of work to be ground between the fingers 100 and lip 94 thereof and holds said piece of work against said chuck until the particular chuck 36ª arrives at the point a on the cam when the fingers 100 will be depressed to securely clamp the work in position during the cycle of rotation. The operative remains in position opposite the point b and as each successive chuck comes opposite him removes a piece of work from the then released chuck and inserts another piece in said chuck before it reaches the point a of the cam when it becomes securely clamped to the chuck during the balance of the period of the cycle of revolution of the center 26. A revolving chuck first crosses the periphery 25 of the rotating grinding wheel 24 and as stated, and as diagrammatically shown in Fig. 5 and at the point A in Fig. 4, due to the pressure exerted thereon it is preferably so adjusted that it will overlap the wheel a considerable amount and in crossing the periphery, the revolving work will be subjected to the first stage of the grinding operation, namely, a heavy grinding or abrading which takes a considerable amount off of the material to be removed yet rough due in part to the spring. As also stated hitherto, the work then passes through the first grinding stage to the second grinding stage as shown at the point B in Fig. 4, where the revolving work contacts the periphery of the rim at two places and thus the grinding is evenly distributed over the entire surface to be ground. The first stage of cutting has taken off so much that the work then is quite smooth and bears uniformly against the periphery of the rim and is flattened. The second stage of the grinding operation therefore results in a smoothing out or flattening operation in which the surface of the work is smoothed. The work is then eclipsed across the periphery of the wheel so as to pass across the rim again as diagrammatically illustrated at point C in Fig. 4. In passing across the periphery of the rotating rim again as the rim rotates in a circular direction almost in the same plane as the plane of rotation of the work, it is obvious that a peripheral grain is embedded on the ground work, a highly desirable operation. We thus see that the grinding operation wherein a cup or disk wheel is employed resolves itself in three well defined stages, namely stage A, a heavy grinding stage, stage B, a smoothing or flattening stage when the work contacts the periphery of the rim at two places and stage C, a graining stage where the work in moving again passes across the periphery 25 of the rotating rim. As stated hitherto, if a cup wheel is employed the same three well defined stages will be attained if the table and work are merely moved in a straight line across the rotating rim. As also stated hitherto and as shown in Figs. 7, 8 and 8ª each chuck may be slightly tilted so that the work will tilt at an angle away from the grinding surface of the annulus in the direction of the work's motion while passing through the three stages. In this case while stages A and B will still be well defined, there will be more or less of a merger in the action of the first two stages, the effect of the spring and pressure being more evenly distributed during the first two stages than in the case where it passes across the periphery of the wheel in the same plane therewith and where practically all the effect of the spring is taken up while passing through the rim in stage A. This will tend to make stage A a stage less of a heavy grinding stage and the stage B more of a heavy grinding stage. It is apparent, however, that by tilting the planes of the grinding surfaces and work relative to each other so as to not make them substantially coincident, various different grinding effects may be produced. If desired, the work may be tilted as shown in Fig. 8ª if a clearly conical surface is desired thereon.

As stated hitherto, we preferably rotate a continuous stream of work made up of a plurality of revolving pieces of work across a rotating annulus. Where the stream of work is continuously rotated across said annulus, it permits a novel type of method of loading and unloading of said apparatus as the work is continuously put into a position where the operative can successively load the chuck without changing his position. While we have illustrated in the drawings a continuous stream of work rotating across the periphery of a rotating annulus, it is obvious, however, that for certain features of our invention it may be merely reciprocated across and as stated hitherto, and as pointed out in the appended claim we broadly claim the idea of rotating a piece of work preferably on an axis within itself preferably substantially flat against a rotating grinding element, whether the work center is continuously moving or not and have shown in Fig. 11 a type of machine where the work center is held stationary during the grinding operation. As stated, while for certain features of our invention, it is desirable that the grinding element comprises a rotating annulus, as more clearly pointed out in the appended claim, the grinding element may comprise a wheel of any desired type, preferably for certain features of our invention one having a substantially flat grinding surface. In Fig. 1 we have shown our preferred type of apparatus so designed as to simultaneously subject one piece of work to stage A of the grinding operation heretofore referred to, another piece of work to stage B and another piece of work to stage C of the grinding operation heretofore referred to thus simultaneously combining the functions of three separate machines hitherto thought necessary to perform these operations.

It is understood that our invention is not limited to the specific embodiments shown and methods described, and that various deviations may be made therefrom without departing from the spirit and scope of the appended claim.

What we claim is:

In a grinding machine, a grinding element, a rotatable work holding center mounted opposite a portion of the grinding surface of the grinding element, a plurality of releasable work holding chucks mounted on said center adapted to hold work in grinding relationship to said grinding element, means to rotate said grinding element, means to rotate said work holding center, means to rotate said chucks, means to relatively tilt the grinding element and work, and means to lock said means in relative tilted position.

GEORGE T. HUXFORD.
FRANK E. STRATTON.